E. C. SMITH.
HAY LOADER.
APPLICATION FILED APR. 14, 1919.
1,319,930.
Patented Oct. 28, 1919.
3 SHEETS—SHEET 3.
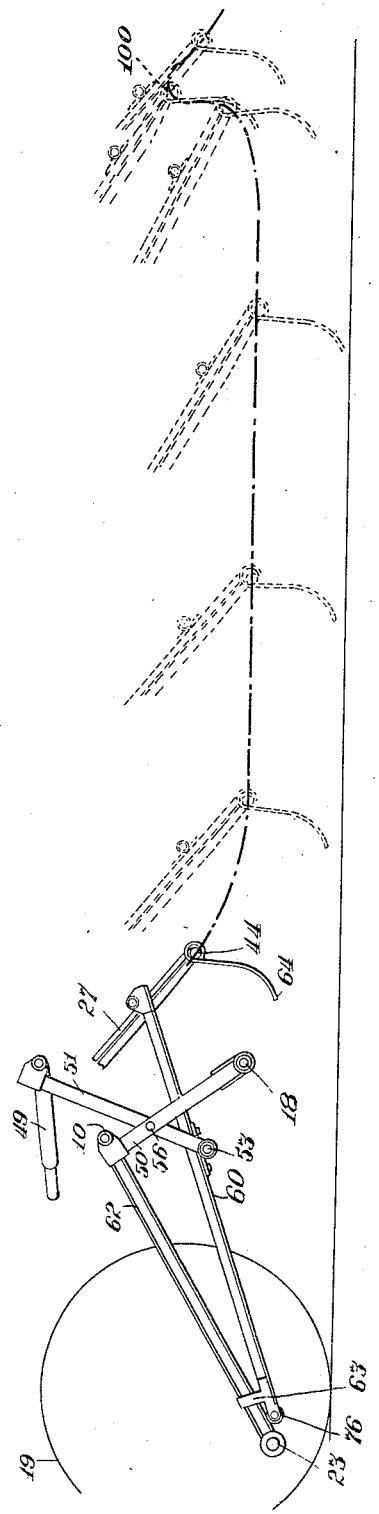
Inventor
Ernest C. Smith
By Gillson & Gillson
Attorneys

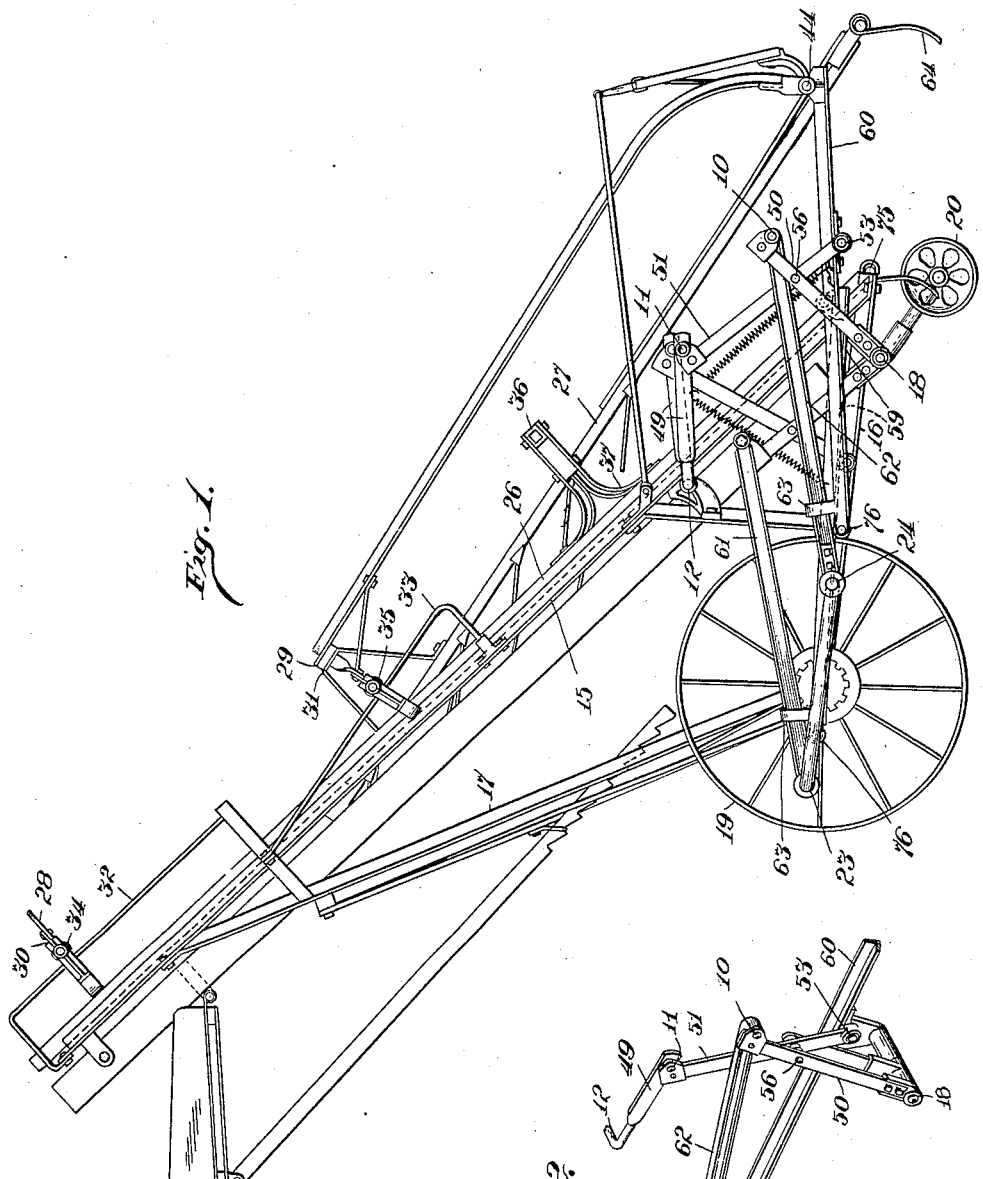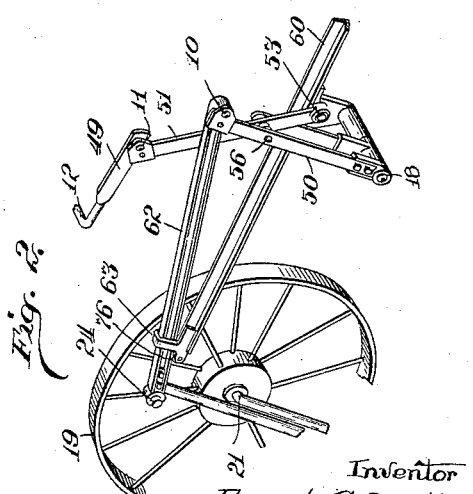

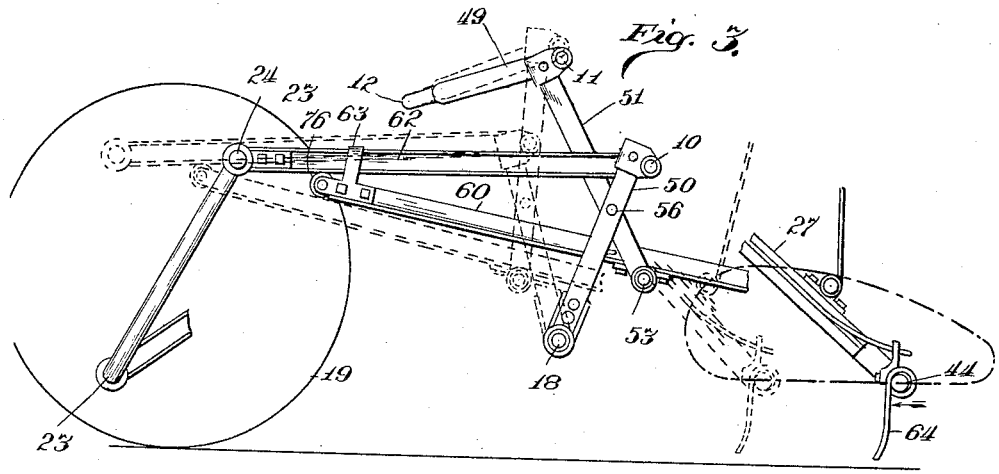
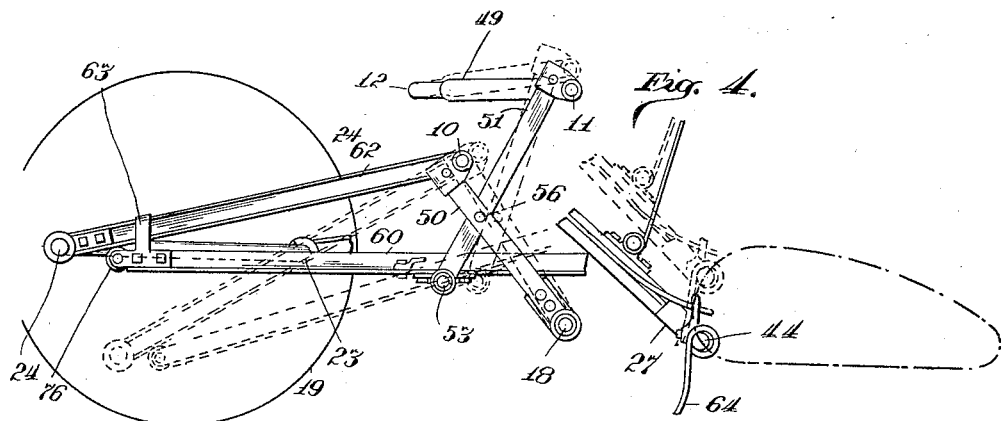
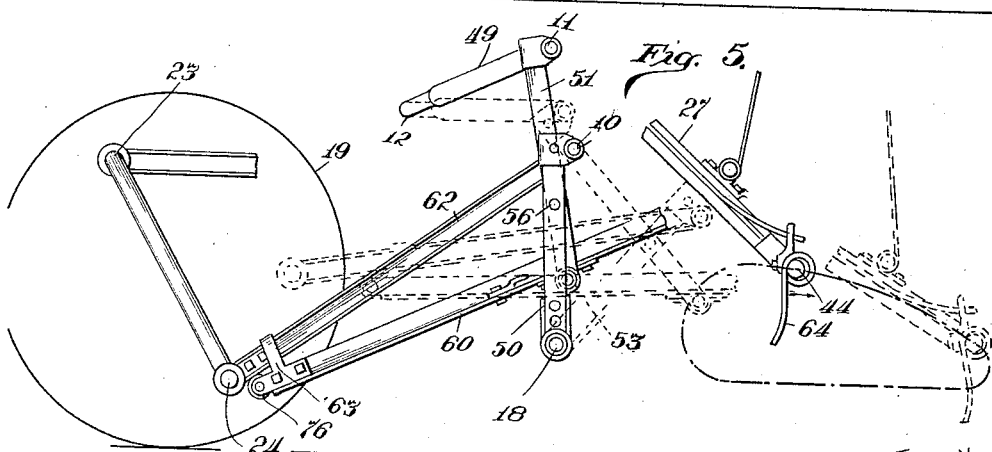

UNITED STATES PATENT OFFICE.

ERNEST C. SMITH, OF CHICAGO, ILLINOIS, ASSIGNOR TO WALTER A. WOOD MOWING & REAPING MACHINE CO., OF HOOSICK FALLS, NEW YORK, A CORPORATION OF NEW YORK.

HAY-LOADER.

1,319,930.

Specification of Letters Patent.   Patented Oct. 28, 1919.

Application filed April 14, 1919.   Serial No. 289,865.

*To all whom it may concern:*

Be it known that I, ERNEST C. SMITH, a citizen of the United States, and resident of Chicago, county of Cook, and State of Illinois, have invented certain new and useful Improvements in Hay-Loaders, of which the following is a specification and which are illustrated in the accompanying drawings, forming a part thereof.

The invention relates to hay loaders, and especially to those of the so-called walking rake type wherein the rakes, during their gathering movements, travel a substantial distance in a path practically parallel with the surface of the ground, and in their elevating movements, are a substantial distance from the ground to clear the gathered hay before beginning the next raking movement. The object of the invention is to provide an improved hay loader of the type described.

The invention forming the subject matter of the present application will be found disclosed as a modification in my former Patent No. 1,265,969, granted May 14, 1918.

In the drawings accompanying and forming a part of this specification:—

Figure 1 is a side view of a hay loader provided with the improved rake-operating means forming the subject of the present invention;

Fig. 2 is a perspective view of the system of levers and cranks comprised in the said rake operating means, Figs. 3, 4 and 5 are detail side views, showing the parts in different positions in their cycle of operation, the dotted lines in each figure illustrating a position of the parts slightly advanced from the position shown in full lines in the same figure, Fig. 6 is a representation of the paths taken by the various centers of movement in relation to the ground, the heavy line indicating the path of movement of the ends of the rake teeth, Fig. 7 is a representation of the paths of movement of the alternately working rake teeth showing the overlap of their raking action.

The hay loader is illustrated as comprising a frame including inclined side members, as 15, horizontal side members, as 16, uprights, one of which is shown at 17, a cross-rod 18, and the said frame being mounted upon drive wheels, as 19, and caster wheels, as 20. The axle 21 upon which the drive wheels 19 are fitted is constructed as usual to provide two diametrically opposed cranks, as 23 and 24, upon the end of the same, the said two cranks being located outside of the adjacent drive wheel. Two sets of alternately moving oscillating toothed bars, which operate to elevate the hay, are represented at 26 and 27.

The gathering of the hay is accomplished by a plurality of rakes, as 64, one rake being mounted at the lower end of each of the toothed bars 26, 27. The toothed bars are supported at their upper ends from cross-ties 28 and 29, these cross-ties being secured to brackets 30 and 31, respectively. Two guide rods 32, 33, are supported upon the inclined side members, as 15 of the frame, and each of the brackets 30 and 31 is guided upon one of these rods by means of a trolley, as 34 or 35. The several oscillating bars, as 26, of one set are connected intermediate their ends by an elevated cross tie 36 and spacing brackets, as 37. The two sets of oscillating bars are directly engaged by links 59 and 60 for actuating the same, each of said links being pivoted to a member connecting the corresponding bars, as at 44 and 75.

The system of levers employed for imparting the desired movement to the rakes 64 will be best understood from Fig. 2, where one set of levers is shown in perspective, separated from the rest of the mechanism. It will also be understood that two sets, such as illustrated in Fig. 2 will be provided at each side of the machine, one set at each side operating upon each of the sets of rakes 64. The levers illustrated comprise a link 62 attached at one end to one of the cranks, as 24, of the adjacent pair of cranks 23, 24, and at the other end at the upper end of a crank 50 which is pivoted at its lower end upon the adjacent end of the cross-rod 18. At a point, as 56, below the upper end of the crank 50, a second link or lever 51 is pivoted. The corresponding link, as 60, which is pivotally attached to the cross member connecting the rakes, as at 44 (Fig. 1) is pivoted at a point intermediate its ends to lever or link 51, as at 53, and extends therebeyond to a point adjacent the crank end of link 62, with which it has a sliding connection through a yoke 63 and antifriction roller 76. The weight of the corresponding rakes 64 and toothed bars, as 27 accordingly tends to swing the forward end of the links 60 upwardly about the pivot 53 and this tendency is resisted by the bearing of the forward end of link 60 upwardly against the under side of the link 62. The upper end of link 51 is connected, as at 11, to the free end of a crank 49, which crank has its other end 12 pivotally attached to the frame of the machine.

The result of the rotation of the cranks 23, or 24, each acting upon one of the sets of oscillating bars, as 26 or 27, and the associated rakes 64 through one of the systems of levers and cranks just described, is graphically set forth in Figs. 3, 4 and 5, showing the changes brought about in the position of the parts by movement of the corresponding wheel 19 over the ground.

By comparison of Figs. 3 and 4 with Fig. 5, it will be seen that the working strokes of the rakes 64 and toothed bars 26 or 27, illustrated in Figs. 3 and 4, are more powerful than the return stroke illustrated in Fig. 5. That is to say, the full and dotted line positions illustrated in each of Figs. 3, 4 and 5, represent the travel of the parts during an equal movement of the corresponding crank 23 or 24. As the distance between the full and dotted line positions of the rake 64, shown in Fig. 5, is considerably greater than the distance between the two positions of the rake illustrated in each of Figs. 3 and 4, it follows that the movements of the rakes through those parts of the cycle of movement illustrated in Figs. 3 and 4 are accomplished with greater leverage than is the movement through the part of the cycle illustrated in Fig. 5. Furthermore, the horizontal travel of the rakes 64 during each cycle of movement is of course considerably greater than the horizontal throw of the corresponding crank 23 or 24. In fact, with the construction shown this increase of horizontal travel of the rakes 64 is sufficient to cause the strokes of the rakes of the two sets to overlap upon the ground during the forward travel of the machine.

Link 62 is a lever of the second class, having its fulcrum at 10, power applied at 24, and weight applied at the roller 76. Link 60 is a lever of the first class, having its power applied at roller 76, its fulcrum at 53 and its weight at 44, and link 51 is a lever of the third class having power applied at 56 between weight 53 and fulcrum 11. Crank 50 is likewise a lever of the third class, the weight being at 56 between the power at 10 and the fulcrum at 18. The fulcrum of each of the above described levers, with the single exception of lever or crank 50, is movable during operation, and the result of the coaction of the levers and movable fulcrums disclosed is the path of motion of the rake illustrated in Figs. 3, 4 and 5.

In Fig. 6 is shown the result of plotting the successive positions of the various centers of movement of the levers as the frame moves over the ground and the heavy line represents the path of movement of the rake teeth. The dotted outlines show the position of a rake tooth at successive equal intervals of time. From this curve it will be seen that over 70% of the travel of the rake teeth is near enough to the ground to advance hay since the forward motion of the rakes, while raised from the ground, as at 100, is very slight. The fraction of time required for a complete cycle, occupied by the three circles, at 100, is one-third but the forward travel accomplished while in these positions is less than 15% of one cycle.

In Fig. 7 are shown the paths of the two sets of rake teeth relative to each other and to the ground. The separate paths are drawn adjacent each other, one displaced upwardly so as to admit of a comparison of their position at any given moment. From an inspection of this figure it will be seen that the raking action of the two sets overlap and that during a substantial portion of their time both sets are raking at once.

I claim as my invention:

1. In a harvesting machine, in combination, a traveling frame, a crank turned by the travel of said frame, an oscillating rake, a link connected at one end to said crank, a second link connected at one end to said rake, means pivotally connecting said links, and means swingingly supporting said link connecting means.

2. In a harvesting machine, in combination, a traveling frame, a crank turned by the travel of said frame, an oscillating rake, a link connected at one end to said crank, a second link connected at one end to said rake, means pivotally connecting said links, means swingingly supporting said link connecting means, and means modifying the effect of said swinging support upon said rake.

3. In a harvesting machine, in combination, a traveling frame, a crank turned in a vertical plane by the travel of the frame, an oscillating rake, two other cranks pivoted to the frame at different levels to swing in vertical planes, a link connecting the two last mentioned cranks at points remote from their frame connection, a second link connecting the first mentioned link and the rake, and a third link actuated by the turning of the first mentioned crank for swinging the second mentioned link and the two second mentioned cranks.

4. In a harvesting machine, in combination, a traveling frame, a crank turned by the travel of the frame, an oscillating rake, a pair of cranks pivoted to the frame, a link connecting the first said crank and the end of one of said pair, a second link connecting the end of the other crank of said pair and an intermediate point of the first of said pair of cranks and extending therebeyond, and a third link pivotally attached to said rake, to the end of said second link and having sliding engagement with said first link.

5. In a hay loader, in combination, a traveling frame, a crank turned by travel of the frame, an oscillating rake, a crank pivoted at its lower end to the frame, a link connected at its ends to said cranks, a second link connected at an intermediate point to an intermediate point of said second link, a third crank connected to the frame and to an end of said second named link, and a third link connected at one end to said rake, at an intermediate point to said second crank and having sliding engagement at its other end with said first named link, whereby said rake travels parallel with the ground on its forward stroke and is quickly lifted to begin its rearward stroke.

6. In a hay loader, in combination, a movable frame, a crank turned by movement of the frame, an oscillating rake carried by the frame, a lever of the second class connected to said crank and to a movable fulcrum, a lever of the first class connected to said rake and to a movable fulcrum and having power applied thereto by said lever of the second class for vertical movement of the rake and through its movable fulcrum for longitudinal movement of the lever, a lever of the third class having a movable fulcrum, the end of its weight arm serving as the movable fulcrum for said lever of the first class, and power applied to said lever of the third class by longitudinal movement of said lever of the second class.

7. In a harvesting machine, a traveling frame, a rake carried by said frame, a crank turned by movement of said frame and means comprising a plurality of levers supported on movable fulcrums interposed between said crank and said rake whereby cycloidal movement of said crank will cause said rake to move substantially parallel to the ground and away from and back toward the ground alternately, the motion parallel to the ground comprising more than two-thirds of the cycle.

ERNEST C. SMITH.

Copies of this patent may be obtained for five cents each, by addressing the "Commissioner of Patents, Washington, D. C."